No. 838,830. PATENTED DEC. 18, 1906.
L. B. WILLIAMS.
BRAKE.
APPLICATION FILED FEB. 23, 1906.
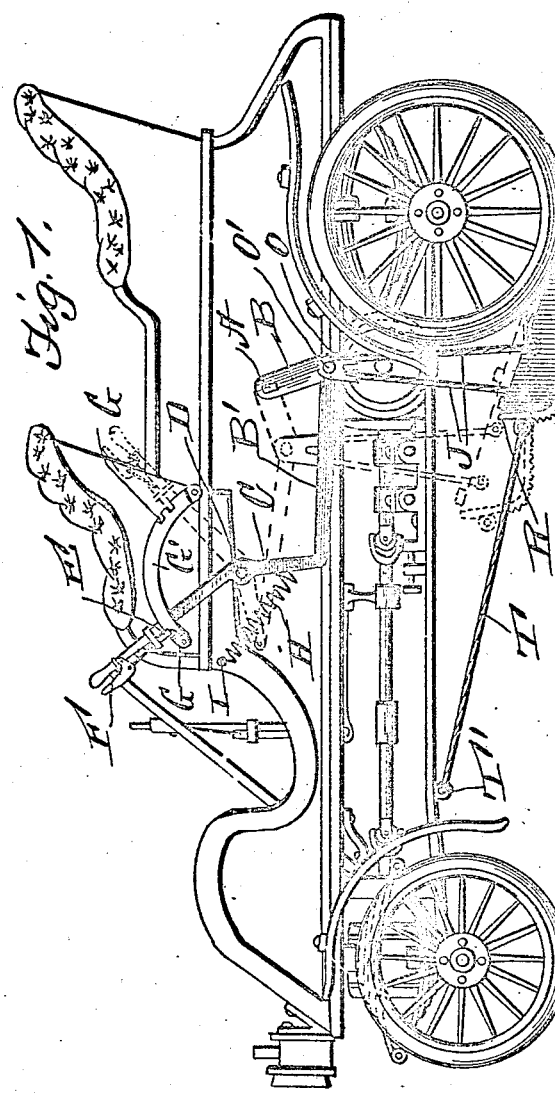
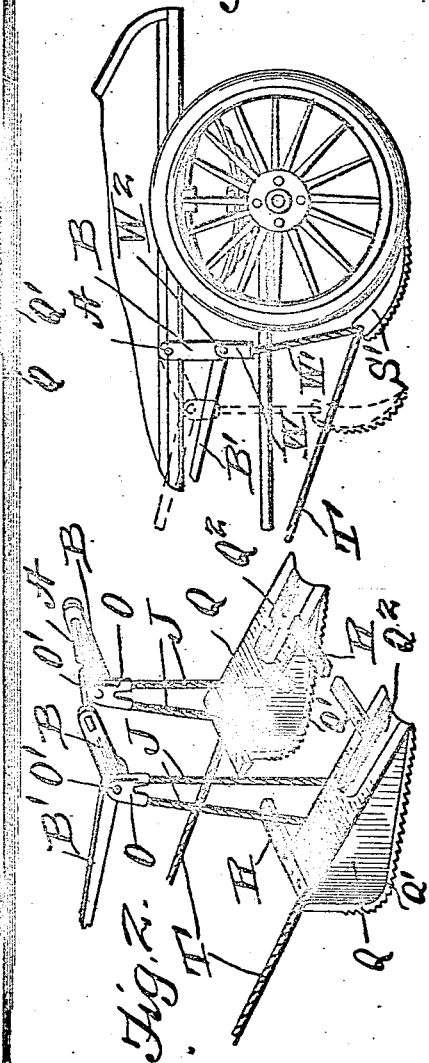
Witnesses
R. A. Boswell
A. L. Hough
Inventor
Lee B. Williams
By Franklin N. Hough
His Atty.

UNITED STATES PATENT OFFICE.

LEE BARTON WILLIAMS, OF PATTON, PENNSYLVANIA.

BRAKE.

No. 838,830.     Specification of Letters Patent.     Patented Dec. 18, 1906.

Application filed February 23, 1906. Serial No. 302,575.

*To all whom it may concern:*

Be it known that I, LEE BARTON WILLIAMS, a citizen of the United States, residing at Patton, in the county of Cambria and State of Pennsylvania, have invented certain new and useful Improvements in Emergency-Brakes for Vehicles; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in brakes for automobiles and other vehicles, and has for its object the provision of a simple and efficient means whereby the vehicle may be made to come to a standstill suddenly, and comprises, essentially, a shoe or block provided for each rear wheel which is actuated by a rock-shaft having connection with lever mechanism, whereby the shoes may be instantly thrown in advance of the rear wheels and raised therefrom.

The invention comprises various details of construction and combinations and arrangements of parts, which will be hereinafter fully described and then specifically defined in the appended claims.

I illustrate my invention in the accompanying drawings, in which—

Figure 1 is a side elevation showing the application of my brake to an automobile, illustrating in dotted lines the positions that the brake-shoes would assume when not set. Fig. 2 is a perspective view of portions of the brake-shoes, and Fig. 3 is a sectional view showing, in elevation, a slight modification.

Reference now being had to the details of the drawings by letter, A designates a rock-shaft which is journaled in suitable bearings upon the body portion of an automobile, and fixed thereto are levers B, one of which having pivotal connection with a link B', which in turn is pivoted to a lever C, which is mounted upon a pin D. Said lever is provided with a pawl E, which is actuated by means of the hand-lever F, and said pawl is designed to engage the notches G of the segment G', mounted upon the side of the seat of the vehicle. A spring H is connected at one end to said lever C below its pivotal point and its other end fastened to a pin I, whereby the lever may be held under the normal tension of the spring in the position shown in dotted lines in Fig. 1.

O O designate plates which are pivotally connected to pins O', which are connected to the levers B.

Q Q designate brake-shoes which are made of any suitable material and provided with serrations Q' upon the lower surface thereof. J J designate steel cables the upper ends of which are fastened to the plates O and their lower ends fastened to the shoes Q in the manner shown clearly in Fig. 2 of the drawings. Said shoes are connected together by means of strips R, and the upper surface of each is recessed or grooved, as at $Q^2$, to receive the tire of the wheel, and each shoe is positioned a suitable distance apart so that when thrown one will come in advance of each rear wheel. A cable T is fastened to each shoe and its forward end connected at T' to the gear of the vehicle, thereby limiting the rearward movement of the shoe.

In Fig. 3 of the drawings I have shown a slight modification, in which the cable W' is connected to a plate W, which is mounted upon a pivot-pin $W^2$, carried by the link B, and said cable is connected also to a brake-shoe S'.

In operation it will be noted that the shoe being held in the elevated position, (shown in dotted lines in Fig. 1,) and when it is desired to apply the brake, the operator by throwing the lever to the position shown in solid lines in Fig. 1 the shoes will fall by gravity directly in front of the rear wheels of the vehicle and held in that position by the suspending-cables J and will be prevented from moving too far rearward by means of the steel cables T. The shoes being wedge-shaped and serrated upon their lower surfaces will exert a frictional force by contact with the ground and securely block the rear wheels. A reverse motion to the lever will return the brakes to their normal position. (Shown in dotted lines.)

In the modification the brakes S' are operated similar to the form shown in Figs. 1 and 2; but the only difference in some of the parts is that there is only one cable connecting the brake-shoes with the plates W and also that the brake-shoes are considerably smaller to present a much better appearance.

From the foregoing it will be observed that by the provision of a brake made in accordance with my invention a simple and efficient means is afforded by which the wheels may be blocked and the vehicle made to come to a sudden stop.

What I claim is—

1. An emergency-brake for vehicles comprising, in combination with the links B, a rod on which said links are mounted, a pivot-pin carried by each link, forked plates O pivotally mounted upon each of said pins, a lever-actuated bar pivotally connected to one of said links, brake-shoes, cables fastened at their lower ends to said shoes, their upper ends each fastened to an arm of said plates, strips connecting said shoes and between which the lower ends of the cables are fastened and means for raising the shoes, as set forth.

2. An emergency-brake for vehicles comprising, in combination with the links B, a rod on which said links are mounted, a pivot-pin carried by each link, forked plates O pivotally mounted upon each of said pins, a lever-actuated bar pivotally connected to one of said links, brake-shoes, cables fastened at their lower ends to said shoes, their upper ends each fastened to an arm of said plates, strips connecting said shoes and between which the lower ends of the cables are fastened, a cable secured at its ends to said shoes, an eye upon the reach of the vehicle through which said cable passes, as set forth.

In testimony whereof I hereunto affix my signature in the presence of two witnesses.

LEE BARTON WILLIAMS.

Witnesses:
F. B. WILLIAMS,
M. E. CRONEMILLER.